(No Model.)
E. P. USHER.
STORAGE BATTERY.
No. 509,271. Patented Nov. 21, 1893.
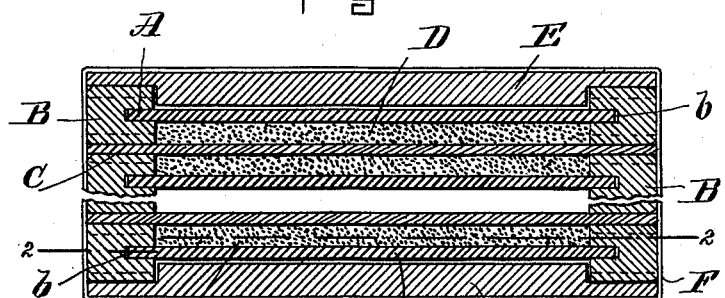
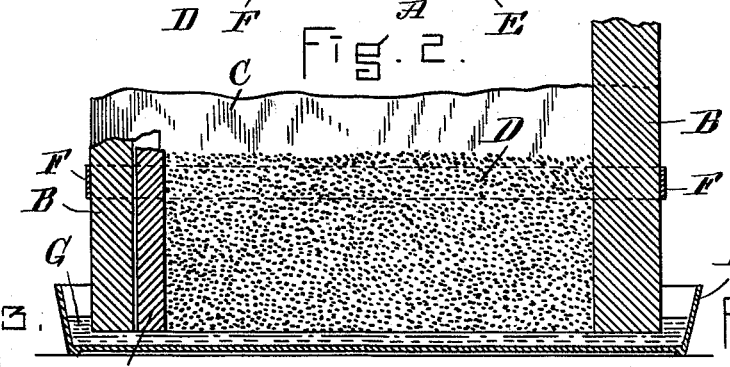
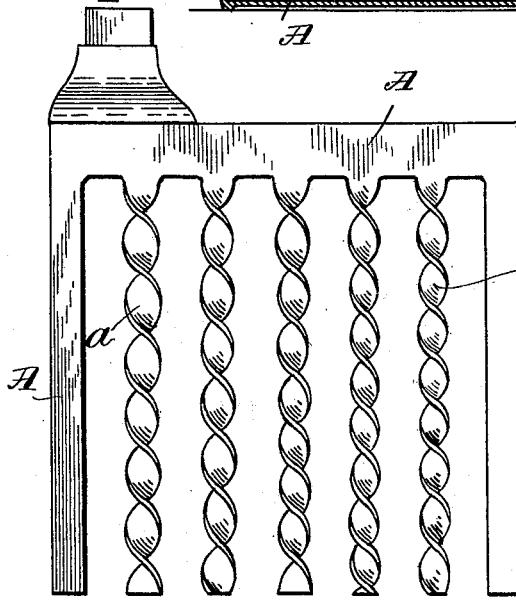
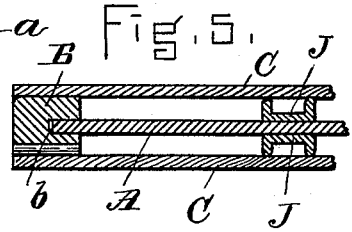
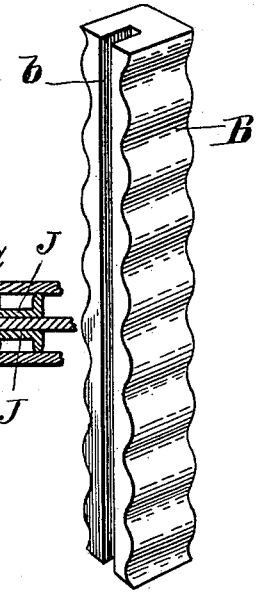
WITNESSES.
Henry Marsh.
L. F. Bridge.
INVENTOR.
Edward P. Usher
by A. N. Spencer
his attorney

UNITED STATES PATENT OFFICE.

EDWARD P. USHER, OF GRAFTON, MASSACHUSETTS, ASSIGNOR TO THE HOPEDALE ELECTRIC COMPANY OF WEST VIRGINIA, OF WEST VIRGINIA.

STORAGE-BATTERY.

SPECIFICATION forming part of Letters Patent No. 509,271, dated November 21, 1893.

Application filed January 23, 1893. Serial No. 459,478. (No model.)

*To all whom it may concern:*

Be it known that I, EDWARD P. USHER, of Grafton, in the county of Worcester and State of Massachusetts, have invented certain new and useful Improvements in Storage-Batteries, of which the following, taken in connection with the accompanying drawings, is a specification.

My invention relates to secondary batteries, and is the result of an effort to reduce their cost to the very lowest proportions consistent with the highest efficiency and with adaptation for manufacture on a large scale. I take a plain sheet of lead of the desired shape and certain separator sheets consisting of wood, earthen ware or any equivalent porous substances, together with spacers or end pieces to hold the other parts in proper position, and a filling of active material. These spacers or end pieces are provided with a slot their whole length, to receive the edge of the lead sheet, and preferably have two of their sides fluted or corrugated, such fluted sides being those that come against the surface of the separator sheet when the cell is set up. The flutes or corrugations serve to admit the acid between the separator and end pieces, so that it may saturate the filling of active material in which the lead is embedded. I also employ a side piece to place against the last one of the series of plates to give it lateral support. The lead plates rest in the spacer slots with the separators extending between the successive spacers. The cell is built up of several of these sets, and when put together the entire cell is placed in a shallow pan or mold filled with hot liquid gum, which hardens and becomes very firm when it cools. The gum may rise say from one-fourth to one-third of an inch. The lead plates may or may not be held by this gum bottom, but there is a certain advantage in having them removable, while the separators and spacers are held in the gum. The chambers in which the several lead plates are held between separators are filled with powdered lead oxide. When the lugs are connected up the cell is ready to be electrically formed. This form of construction is admirably adapted where the width of the plate is not more than one to two inches, and owing to its extreme cheapness will tend to very much broaden the field of usefulness of the secondary cell.

One advantage of the end spacers as used is that they absolutely prevent a short circuit of the cell by any contact between the two plates on their vertical edges. This has been a very common source of trouble, particularly at the lower part of the cell. As this cell is now improved by me it is impossible that a short circuit should be in any way established so long as the cell is in its correct condition from a mechanical point of view. When the plates have considerable breadth I use intermediate spacers placed on opposite sides of the plate, to keep it in about a central position between two separators. These spacers I groove vertically to give open wells for the gases to rise and the acid to circulate in. In some cases the end spacers will be in two parts, on opposite sides of the plate, instead of being single and slotted. By preference I slit the plate vertically from bottom nearly to the top, and give some or all of the prongs between the ends a spiral twist, the active material filling into the convolutions of the twisted prongs. The plain ends of the plate enter the slots of the spacers.

In the drawings, Figure 1 is a horizontal section through a battery constructed according to my invention. Fig. 2 is a vertical section on line 2—2 of Fig. 1, showing the lower portion of the battery and the shallow dish of gum in which the plates and separators are set. Fig. 3 is an elevation of the leaden plate or frame, showing the preferred form. Fig. 4 is a perspective view of one of the end spacers, and Fig. 5 is a sectional detail illustrating the intermediate spacers on opposite sides of the metal plate. Fig. 6 is a detail.

A is the leaden or other conducting plate, either a plain sheet or in other suitable form. I prefer the novel form represented in Fig. 3, in which the intermediate portion of the plate is slitted from the bottom upwardly into narrow prongs, part or all of them being twisted spirally. The ends of the plate may be, however, plain and vertical, and fit loosely into the vertical groove $b$ of the end spacers B.

These spacers are strips of wood, hard rubber or the like, preferably corrugated on their sides to permit entrance of the acid.

C C are the separators, interposed between the successive plates and projecting at their ends between the spacers B, thus leaving each plate in the center of a vertical chamber into which I pack a filling of material D to become active. This filling I apply in the form of a dry powder, which fills the spaces each side of the plate and along the convolutions of its twisted prongs.

At each end of the battery cell I employ the outside piece or lateral support E which lies flat against the last negative plate A and spacer B, so that such plate shall not be injured in handling. The whole series of parts, plates, separators, spacers and lateral supports, may then be bound together by the elastic or other band F and set at foot into the shallow pan H and embedded in a layer of cement or gum G, by which they are fixed in their relative positions. The lead oxide or other material D is then filled into the spaces reserved for it.

When the plates A are of considerable width I furnish intermediate spacers J, Fig. 5, on opposite sides of the plate, between it and the adjacent separator. These side spacers have broad grooves which form open vertical wells for the acid to circulate and the gases to rise in.

The entire cell, made up of the parts stated, is placed in a suitable jar or box, and the acid gradually enters through the pores of the separators and the small openings between the separator ends and the corrugated sides of the spacers B, and speedily permeates the entire body of the oxide. Minute perforations may be made through these spacers to serve as inlets in addition to the corrugations.

I claim as my invention—

1. In a storage battery, the combination of metallic conducting pieces, with vertical end spacers which receive the edges of the conducting pieces, porous separators alternating with said pieces and extending at their ends between successive spacers, and a filling of material to become active interposed between said conducting pieces and the separators, substantially as set forth.

2. In a storage battery, the combination of metallic conductors and vertically slotted end spacers adapted to receive the edges of said conductors, with porous separators alternating with them and held at their ends by said spacers, and with a filling of material to become active packed into the chambers between said separators, and in contact with said conductors, substantially as set forth.

3. In a storage battery, lead plates, porous separators, end-spacers to hold said parts in place, packed active material in the inclosed spaces, and outside pieces applied laterally to the outermost plates, substantially as set forth.

4. In a secondary battery, the combination with conducting plates and non-conducting separators of the described spacers, having broad grooves which form vertical wells on each side of the conducting plate, substantially as set forth.

5. In a storage battery, conducting plates and porous separators, in combination with vertical space-pieces between said parts at points intermediate between their ends, and with a filling of material to become active, in the inclosed spaces, substantially as set forth.

6. The described end-spacers for the plates and separators of secondary batteries, consisting of bars or blocks grooved or slotted to receive the plates, and having fluted sides, substantially as and for the purpose set forth.

7. In a storage battery, the combination with porous, non-conducting separators, end-spacers, and a filling of material to become active, of the described conductor consisting of a metallic sheet slitted vertically from bottom nearly to top, and having part of the prongs so formed twisted spirally, substantially as set forth.

8. In a storage battery, the combination with the conducting plates, of porous separators interposed between successive plates, end-spacers to hold the plates and separators in position, and a shallow bed of cement or gum in which the bottoms of such separators and spacers are embedded, substantially as set forth.

9. In a storage battery, a series of porous separators and end-spacers adapted to hold the plates and separators in position, in combination with a body of cement or gum in which the bottoms of the separators and spacers are embedded, and with interposed conducting plates, not held by the gum, substantially as set forth.

In testimony whereof I have signed my name to this specification, in the presence of two subscribing witnesses, on this 21st day of January, A. D. 1893.

EDWARD P. USHER.

Witnesses:
A. H. SPENCER,
THOMAS J. KENNY.